3 2 4
CROSS REFERENCE SEARCH ROOM

Sept. 9, 1969 W. K. FRENCH 3,466,394
VOICE VERIFICATION SYSTEM
Filed May 2, 1966 4 Sheets-Sheet 1

INVENTOR.
WALTER K. FRENCH
BY Ronald J. Kransdorf
ATTORNEY

VOICE VERIFICATION SYSTEM

Filed May 2, 1966 4 Sheets-Sheet 2

Sept. 9, 1969 W. K. FRENCH 3,466,394

VOICE VERIFICATION SYSTEM

Filed May 2, 1966 4 Sheets-Sheet 3

Sept. 9, 1969 W. K. FRENCH 3,466,394

VOICE VERIFICATION SYSTEM

Filed May 2, 1966 4 Sheets-Sheet 4

United States Patent Office 3,466,394
Patented Sept. 9, 1969

3,466,394

VOICE VERIFICATION SYSTEM

Walter K. French, Montrose, N.Y., assignor to International Business Machines Corporation, Armonk, N.Y., a corporation of New York Filed May 2, 1966, Ser. No. 546,945
Int. Cl. H04m *1/24*
U.S. Cl. 179—1 14 Claims

ABSTRACT OF THE DISCLOSURE

This system provides for identification of an individual by a voiced input which is compared with a previously stored reference or voice signature of that individual. The identification is based upon fine resolution data in the speaker's voice that is distinctive of his voice. This fine resolution data consists of data representative of the first few pitch periods of several pulse periods taken from a particular spoken word. The voiced input is compared with the voice signature and the voiced input is verified as being the same as the voice signature if the differences are within preselected limits. If within the limits, a verify signal is generated. If not within the limits, a non-verify signal is generated.

This invention relates to a system for verifying the identity of an individual and more particularly to a system which verifies the identity of an individual by recognizing his voice.

The identity of an individual must be verified any time admittance is required to a secured area, either in industry or government, or any time merchandise or services are purchased on credit. The standard methods of verification include recognizing an individual's physical characteristics either by knowing the individual or by comparing his physical characteristics with a photograph and description; recognizing an individual's signature by comparing it with a known sample; or recognizing his fingerprints. Since a skilled person may easily disguise himself to look like another and forged signatures are often difficult to detect, the first two forms of verification described above are not particularly reliable. While fingerprint verification is reliable, it is, as now practiced, a cumbersome and sometimes messy operation which is not well suited for credit transactions, and is a nuisance when used to gain admittance to a secured area. Two additional problems with the forms of verification described above are: (1) no effective way has yet been provided to automate them, and (2) they require the individual to be physically present at the verification location.

The current trend in commercial transactions is toward a greatly expanded use of credit. In order to handle this increased volume of credit transactions, many companies may be forced to automate their verification procedures. Another trend is toward the increased use of the telephone in transacting business. This trend is particularly noticeable in the computer industry where time-sharing has made it possible for an individual to have a terminal at his home or place of business which he connects to a large computer through telephone lines. Since the computer may contain proprietary information of an individual or company, it is important that only the proper individual be permitted access to portions of the program in the main computer relating to his business. Similarly, when an individual telephones a large order to a distributor, or an individual asks for a financial statement from his bank, it is important that the person receiving the call be able to verify the identity of the caller.

At present, voice verification has generally been limited to the presenting of a password by the individual, with verification being based on the individual's knowledge of the password rather than on recognition of the individual's voice. Studies have shown, however, that there are certain characteristics of an individual's voice which cannot be disguised and which are as effective in identifying an individual as the ridges of his fingerprint. Systems which have heretofore been devised for utilizing the phenomena have required the storage of large amounts of information and have generally proved to be otherwise unsatisfactory.

It is therefore a primary object of this invention to provide an improved system for verifying the identity of an individual.

A more specific object of this invention is to provide a system for verifying the identity of an individual which may easily be automated and which does not necessarily require that the individual be present at the verification location.

A still more specific object of this invention is to provide a system for verifying the identity of an individual by recognizing unique characteristics of his voice.

Another object of this invention is to provide a voice-verification system which does not require the storage of a great deal of data.

In accordance with these objects, this invention provides a system for recognizing an individual's voice which includes a device for storing a voice signature of the individual. In a preferred embodiment of the invention the voice signature is derived by detecting and storing the normalized coordinates of the first few peaks and valleys of each pulse period of a predetermined phrase spoken by the individual. Since there is a large number of pulse periods in even a short phrase, and most pulse periods differ imperceptively from adjacent pulse periods, the amount of storage required by the system is substantially reduced by storing the first pulse period, and storing the coordinate of a succeeding pulse period only if they differ significantly from the coordinates of the previously stored pulse period. The characteristic coordinates of a voiced input from the individual are then determined and selectively compared against those of the stored voiced signature. In the preferred embodiment of the invention, the characteristic coordinates of each pulse period of the voiced input are compared against those of three adjacent pulse periods of the stored signature. A determination is made as to which of the three selected pulse periods most nearly matches the input pulse period, and the difference between the most-nearly-matching pulse periods and the input pulse period is added to a previously determined average difference for other pulse periods. In making the comparison, certain peaks and valleys of the pulse period, as for example the first few peaks and valleys, may be weighted more heavily than other peaks and valleys. When a most-nearly-matching pulse period is selected, the system is adjusted such that the next pulse period will be compared against three adjacent pulse periods with the most-nearly-matching pulse period being the center one of these three. This permits a stepping through of the stored signature at a proper rate, with each pulse period of the voiced input being compared with the proper pulse period of the stored signature, even though, as indicated above, the stored signature contains only a few of the pulse periods of the original input. If the accumulated average difference ever exceeds a predetermined threshold, a non-verify indication is generated. If the end of the stored signature is reached without a nonverify indication being generated, a verify indication is generated.

The foregoing and other objects, features and advantages of the invention will be apparent from the following more particular description of a preferred embodiment of the invention as illustrated in the accompanying drawings.

Figure 2:
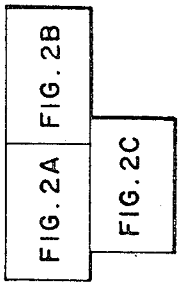
FIG. 2 is a diagram illustrating how
Figure 2A:
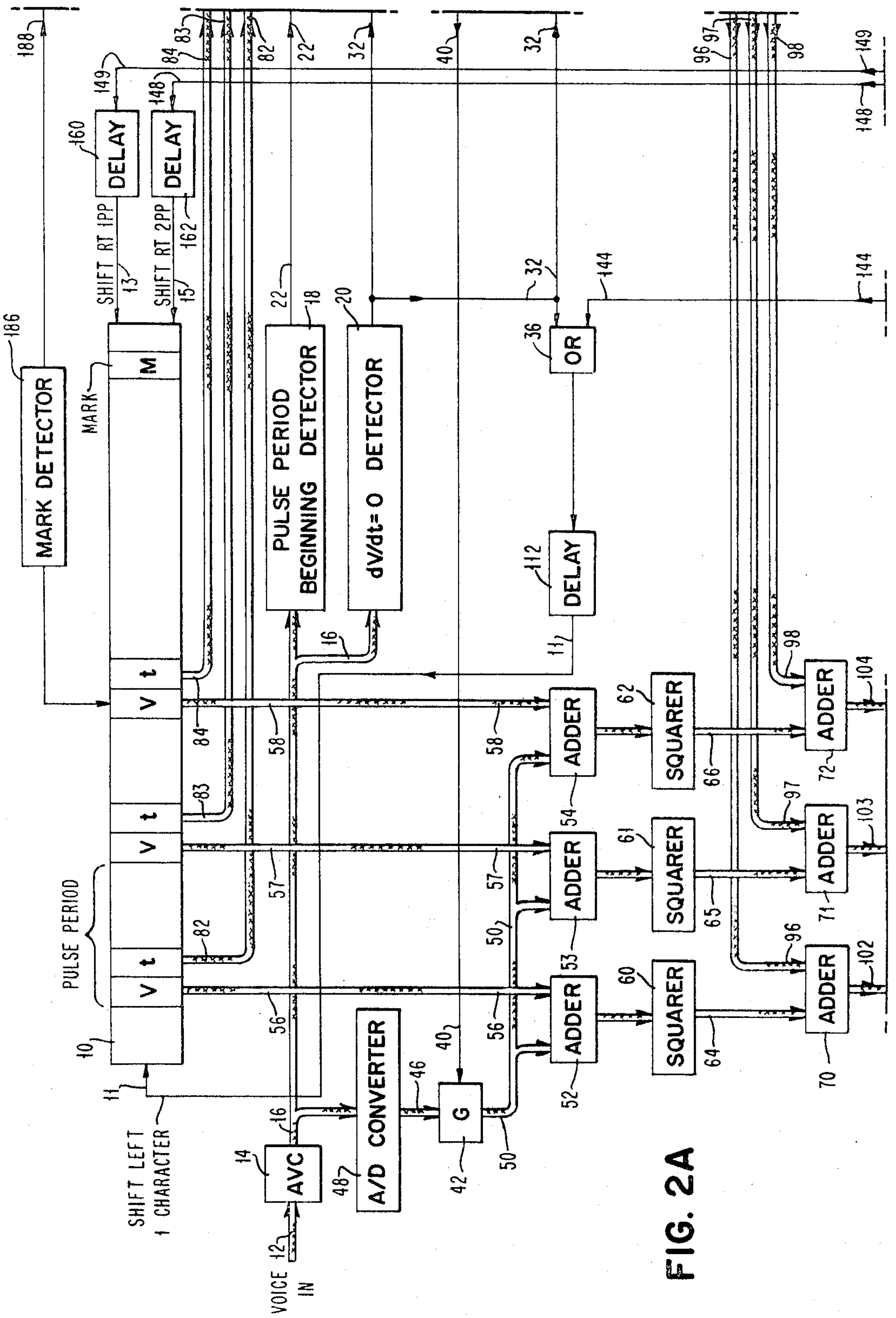
FIGS. 2A–2C are combined to form a schematic block diagram of a preferred embodiment of the voice verification system of this invention.
Figure 2B:
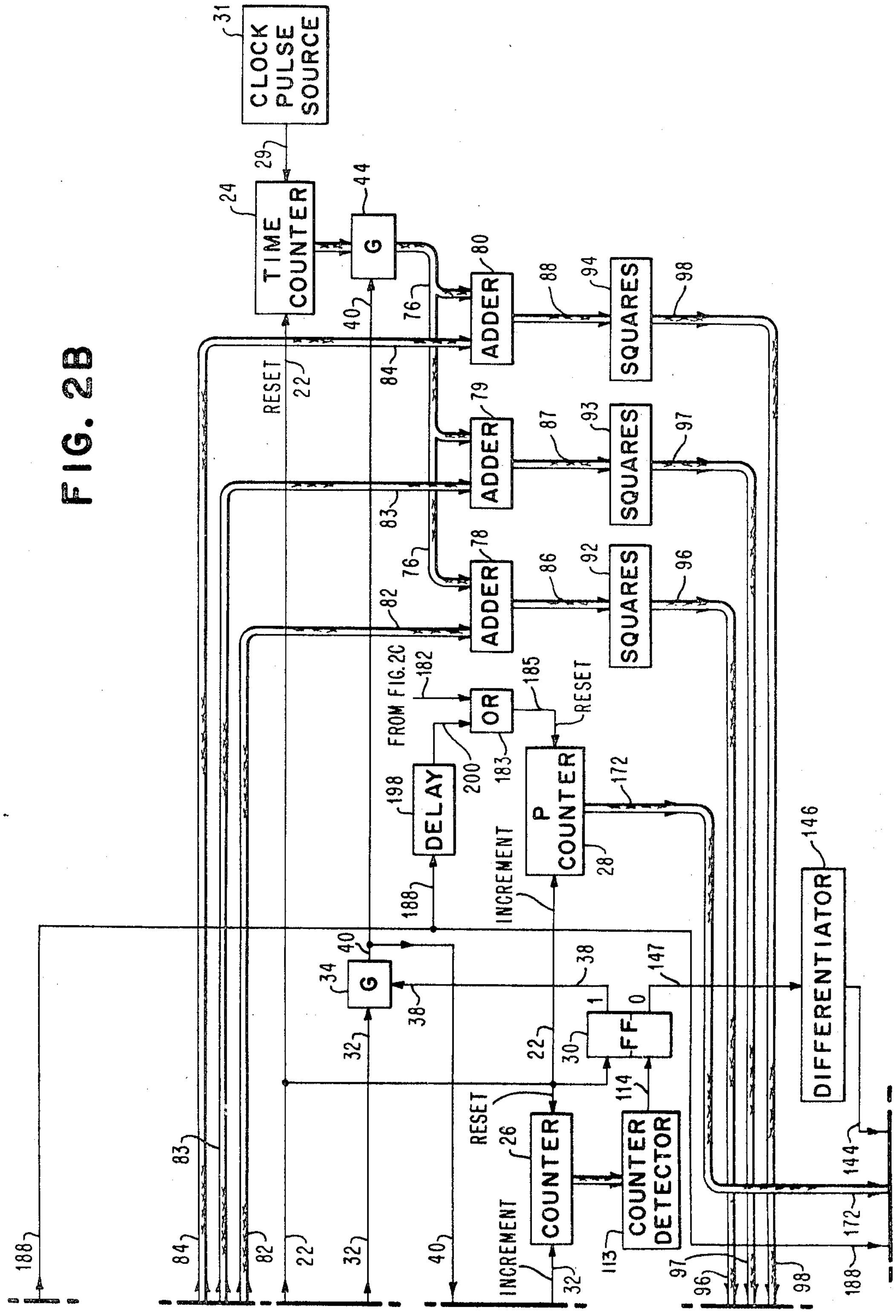
Figure 2C:
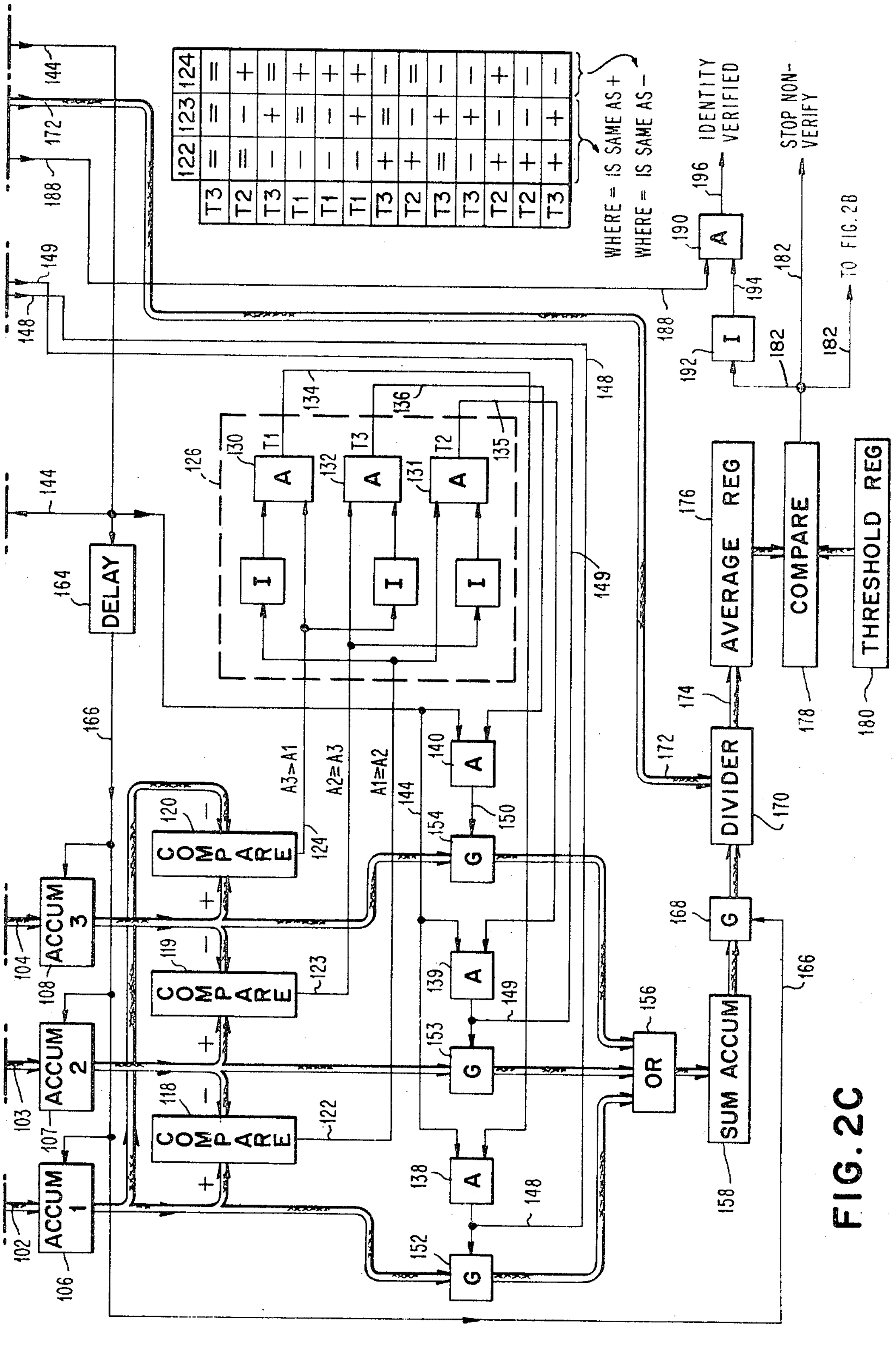

FIGS. 2A–2C, when combined, form a schematic block diagram of a preferred embodiment of the voice verification system of this invention.

Human speech is made up of voiced portions and fricative (i.e., hiss) sounds. The fricative sound is random and is therefore of little use in verifying the identity of an individual. However, the voiced portions of speech, are semiperiodic and contain information unique to the individual. Whenever a voiced sound is uttered, the vocal cords, which are more accurately described as vocal folds because of their anatomic structure, move together and then apart in such a manner as to vary the size of the opening between them. This opening is referred to as the glottis. The rate at which the vocal folds move together and apart determines the pitch of the voiced sound. During a portion of each cycle of the voiced sound, these cycles being referred to as pitch periods, the glottis is completely closed and the supply of air from the lungs causes a rise in pressure which reaches a maximum at this time. When the glottis opens, there is an explosive burst of air which relieves the pressure. Each time one of these bursts occurs, a new pitch period is begun.

The burst of air from the glottis is passed through various cavities (including the nasal cavities) in the vocal tract. While the person has conscious control over the pitch of his voice (i.e., the rate at which the glottis opens and closes) he has no control over certain characteristics of the voice sound which result from resonance in the cavities of the vocal tract and from tensions of the body. The vocal tract also causes certain higher frequency components to be superimposed on the waveform of the fundamental pitch frequency. Since all of these harmonics originate at the instant when the glottis opens, the first few peaks and valleys of each pulse period are substantially uneffected by these harmonics. However, the later waves of the pulse period are substantially effected by these harmonics and therefore are less meaningful.

Another characteristic of the voiced portion of human speech is that there are a large number of pulse periods (i.e., for example 10–30) for each uttered syllable, but only two or three of these pulse periods differ in any substantial manner from those around them.

Figure 1:
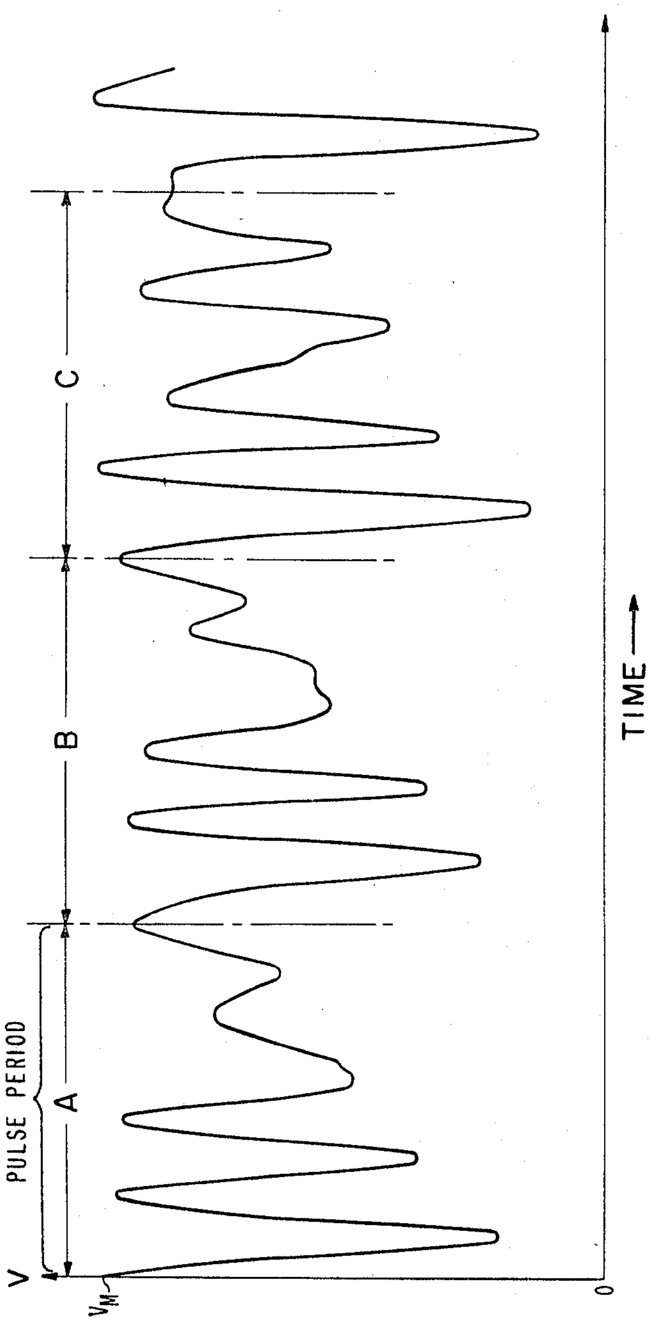
FIG. 1 is a wave diagram representative of a speech input.

The various characteristics described above for the voiced portion of speech may be utilized in a device for verifying the identity of an individual speaking a predetermined set of words. This predetermined set of words spoken in the individual's voice, may be considered as a voice signature of the individual. However, the term "voice signature" in the following discussion, will be used when referring to a stored portion of the spoken set of words which portion is derived in a manner to be described later. Referring first to FIG. 1, the wave shape for three representative pulse periods (A, B, and C) is shown. The horizontal axes of this waveform is representative of time and the vertical axes representative of voltage. For purposes of this invention, it will be convenient to consider the peaks and valleys as both being of positive potential and the voltage scale has therefore been shown adjusted accordingly. From the figure, it is seen that the first five peaks and valleys of each pulse period, while differing slightly in relative amplitude, have substantially the same shape, while the remaining peaks and valleys of the pulse periods differ substantially. While in FIG. 1, differences are shown between the first five peaks and valleys of the adjacent pulse periods, in practice, adjacent pulse periods would be nearly identical and a substantial change would be noticed only after a number of pulse periods had passed.

Referring now to FIG. 2A, it is seen that the system of the preferred embodiment of this invention includes a shift register 10 in which the V (voltage) and *t* (time) coordinates of the first few peaks and valleys of selected pulse periods of a voiced input of a predetermined set of words of the individual whose identity it is desired to verify (i.e., the voice signature) are stored. In the discussion to follow, peaks and valleys will sometimes be generically referred to as characteristic points. The selected pulse periods which have their coordinates stored may for example be the first pulse period of the voiced input signature, and each succeeding pulse period which shows a substantial change in coordinates from the previously stored pulse period. Since a substantial change would be noted for only about five to ten percent of the pulse periods of a normal voiced input, characteristic coordinates for only five to ten percent of the pulse periods need be stored. Also, as seen above from FIG. 1, only the first few peaks and valleys of each pulse period are actually meaningful, the rest being fairly random, and therefore only the coordinates of the first few peaks and valleys of the selected pulse periods need be stored. The above results in a minimum amount of stored data. For a reason which will be apparent later, the V and *t* values in shift register 10 are stored as negative rather than positive quantities. A specially coded mark M is stored in shift register 10 at the end of the voice signature.

Shift register 10 is of the closed loop type so that data shifted out the right side of the register is stored on the left side and vice versa. All portions of the voice signature are therefore available at all times in shift register 10. The register is shifted left one character position (i.e., the number of bit positions required to store one V and one *t* value) by a signal applied to line 11, is shifted one pulse period to the right by a signal applied to line 13, and is shifted two pulse periods to the right by a signal applied to line 15. The manner in which the signals on lines 11, 13, and 15 are generated will be described later.

It is assumed that before the system shown in FIGS. 2A–2C is brought into operation, the individual has initially identified himself and, as a result of this identification, a voice signature for that individual is transferred from a back-up memory into shift register 10. When this preliminary operation has been completed, the individual speaks the phrase which is his voiced input signature into a telephone, microphone, or a similar device. This device converts the individual's voice into electrical impulses which are applied through lines 12 and automatic volume control (AVC) circuit 14 to lines 16. AVC circuit 14 normalizes the inputs so as to eliminate variations in the voiced signature caused by differences in the volume (i.e., loudness) of the person's voice. The signals on lines 16 are applied to pulse-period-beginning detector 18 and $(dv/dt)$-equals-zero detector 20. A suitable circuit for determining when the glottis has opened, emitting a blast of air to start a new pulse period, is shown in copending application Ser. No. 373,751, entitled "Pitch Modification of Audio Wave Forms" filed June 9, 1964 on behalf of Walter K. French et al. and assigned to the assignee of the instant application. This circuit operates by storing the peak-to-peak transitions of the audio waveform and comparing each peak-to-peak transition with the next peak-to-peak transition. The greater of the two is then retained for comparison with successive peak-to-peak transitions until, after a given length of waveform has been scanned, the maximum analog peak-to-peak transition is retained in a storage circuit. The point of occurrence of each maximum peak-to-peak transition is specified by a value in a counter. The maximum peak-to-peak transitions represent the start of each pitch period of the audio waveform.

Circuit 20 may be any standard circuit for performing the indicated function and is used for detecting the occurrence of each peak and valley of the audio waveform.

Output line 22 from pulse period beginning detector 18 is connected to reset time-counter 24 and peak-and-valley counter 26 and to increment P (pulse period) counter 28. The signal on line 22 is also applied to set flip-flop 30 to its one state. Time counter 24 is incremented by clock pulses applied to its through line 29 from clockset pulse source 31. Since the beginning of a pulse period is a peak for which the value of $(dv/dt)$ is equal to zero, detector 20 is also generating an output at this time on line 32 which is applied to increment counter 26, to the information input of gate 34, and to one input of OR gate 36. It is assumed that when an increment and reset input are applied simultaneously to counter 26, the counter is left with a count of one therein. If necessary, the signal on line 32 may be delayed slightly in order to assure that this occurs.

It is also assumed that the signal on line 22 has sufficient persistence so that flip-flop 30 is set to its one state, generating a conditioning output signal on line 38 to gate 34, while the signal on line 32 is still being applied to the information input thereof. This results in a signal on output line 40 from gate 34 which is applied as a conditioning input to gates 42 and 44. The information inputs to gates 42 are output lines 46 from analog-to-digital converter 48. The information inputs to analog-to-digital converter 48 are input lines 16 from AVC circuit 14. The signal on line 40 therefore causes a digitized quanity representing the analog value of the detected audio peak to be applied through gates 42 and lines 50 to one set of inputs of adders 52–54. Another set of inputs to adders 52–54 are output lines 56–58 from the memory positions in shift register 10 which contain the V coordinate for the first peak or valley of the first three pulse periods stored therein. As indicated previously, the V and $t$ values stored in shift register 10 are negative so that the results of the additions in adders 52–54 are quantities which are equal to the difference between the applied input value on line 50 and the values applied to lines 56–58. These values are squared in squarers 60–62 and applied through line 64–66 as one set of inputs to adders 70–72.

The signal on line 40 is also applied as the conditioning input to gates 44, permitting the time value stored in time counter 24 to be applied through lines 76 as one set of inputs to adders 78–80. The other set of inputs to adders 78–80 are output lines 82–84 from the $t$ storage position of the first peak or valley for each of the first three pulse periods stored in shift register 10. Since the $t$ values are stored as negative quantities, the outputs from adders 78–80 on lines 86–88 respectively are the difference between the $t$ value on lines 76 and the $t$ value on each of the lines 82–84. These differences are squared in circuits 92–94 and applied through lines 96–98 as the second set of inputs to adders 70–72 respectively. The outputs from adders 70–72 on lines 102–104 respectively represents the sum of the differences between the coordinates of the peak or valley for the voiced input on line 12 and the coordinates of the corresponding peak or valley for the three pulse periods, stored in shift register 10, which are being looked at. The sums on lines 102–104 are applied to accumulators 106–108 respectively.

As indicated previously, the signal on output line 32 from detector 20 is applied as one input to OR gate 36. The output from OR gate 36 is applied through delay 112 to shift-left-one-character input line 11 of shift register 10. The duration of delay 112 is sufficient to permit the additions in adders 52–54 and 78–80 to be completed before the shift operation occurs. When the shift operation has been completed, the V and $t$ coordinates of the second peak or valley (for the wave shapes of FIG. 1 this would be the first valley) for each of the three pulse periods being looked at are adjacent to the lines 56–58 and 82–84.

Nothing further happens until detector 20 again recognizes a $(dv/dt)$-equals-zero condition. When this occurs, counter 26 is incremented to a count of 2 and, since flip-flop 30 is still in its one state, a signal is applied through gate 34 and line 40 to condition gates 42 and 44 to pass the instantaneous V and $t$ values through lines 50 and 76 respectively to adders 52–54 and 78–80. The negative V and $t$ values for the first valley of the pulse periods being looked at in shift register 10 are applied to the other inputs of these adders, with the difference outputs from the adders being squared, summed, and added into the sum stored in accumulators 106–108. When the additions in adders 52–54 and 78–80 have been completed, a delayed output signal from OR gate 36 is applied to shift shift-register 10, one character position to the left, bringing the coordinates of the third characteristic point (i.e., the second peak for the waveforms of FIG. 1) adjacent to the lines 56–58 and 82–84.

The above described sequence of operations is repeated as each peak or valley is detected by detector 20, with the V and $t$ differences between the detected peak or valley and those stored for the three pulse periods being looked at in shift register 10, being summed and added into the sums previously accumulated in accumulators 106–108. Assuming that an initial determination is made that peaks and valleys beyond the fifth for each pulse period have little if any significance in the recognition of an individual's voice, circuit 113 would be set to detect a count of 5 in counter 26. Therefore, when counter 26 is incremented to a count of 5, as a result of detector 20 detecting the fifth peak or valley of a given pulse period, circuit 113 is energized to generate an output signal on line 114 which is applied to reset flip-flop 30 to its zero state. Since time delays are introduced by the incrementing of counter 26 and the operation of circuit 113, it is assumed that the pulse on line 32 will pass through gate 34 and line 40 to perform the necessary function of passing the coordinates for the fifth peak or valley to the appropriate adders before flip-flop 30 is reset to tis zero state thereby deconditioning gate 34. If timing problems develop, additional delays may be introduced to assure proper operation of the system. The switching of flip-flop 30 to its zero state prevents subsequently detected characteristic points from entering the verification determination.

Referring now to FIG. 2C, it is seen that the contents of accumulators 106 and 107 are being continuously compared against each other in compare circuit 118. Similarly, the contents of accumulator 107 and accumulator 108 are being continuously compared against each other in compare circuit 119 and the contents of accumulator 108 and 106 are being continuously compared against each other in compare circuit 120. A signal appears on output line 122 from compare circuit 118 if the contents of accumulator 106 are greater than or equal to the contents of accumulator 107; on output line 123 from compare circuit 119 if the contents of accumulator 107 are greater than or equal to the contents of accumulator 108; and on output line 124 from compare circuit 120 only if the contents of accumulator 108 are greater than the contents of accumulator 106. From the above it is seen that an equal conditions in compare circuit 118 or 119 results in a positive output on the corresponding line 122 or 123 whereas an equal condition in compare circuit 120 results in a negative output on line 124. The signals on lines 122–124 are applied as the inputs to logic circuit 126. The truth table for the logic circuit 126 is shown in the chart adjacent thereto. From the truth table and circuit 126, it is seen that if there is a signal on line 124 and no signal on line 122, AND gate 130 is fully conditioned to generate an output signal on T1 line 134 which is applied as one of the conditioning inputs to AND gate 138. If there is a signal on line 122 and no signal on line 123, AND gate 131 is fully conditioned to generate an output signal on T2 line 135 which is applied as one conditioning input to AND gate 139. If there is a signal on line 123 and no signal on line 124, AND gate 132 is conditioned to generate an output signal on line 136 which is applied as one conditioning input to AND gate 140. The other input to AND gates 138–140 is output line 144 from differentiator 146 (FIG. 2B), the input to differentiator 146 being zero-side output line 147 from flip-flop 30. Therefore, when flip-flop 30 is reset to its zero state as a result of the count in counter 26 being incremented to a count of C (5 for the example chosen) differentiator 146 generates a pulse on line 144 which results in one of the AND gates 138–140 being fully conditioned. The particular AND gate which is fully conditioned at this time depends on which of the accumulators 106–108 has the lowest value stored in it at this time. It will be assumed, for this discussion, that the first pulse period of the voiced signature is stored in shift register 10 adjacent to the lines 57 and 83, with blanks initially being stored adjacent to the lines 56 and 82. Under these conditions, if the input is in fact from the proper person, accumulator 107 will have the lowest sum at this time and circuit 126 will be generating an output signal on T2 line 135 from AND gate 131. This signal fully conditions AND gate 139 to generate an output signal on line 149 which conditions gate 153 to pass the contents of accumulator 107 through OR gates 156 to sum accumulator 158. The signal on output line 144 from differentiator 146 is also applied through OR gate 36 and delay 112 to cause shift register 10 to be shifted one character position to the left. This would bring the coordinates for the first characteristic point, of the pulse period following that which was previously adjacent to the lines 56–58 and 82–84, adjacent to these lines or, in other words would complete a one pulse period shift to the left for the contents of shift register 10. Since, during the previous pulse period, the best match was had with the center one of the three pulse periods compared against, it is desired to retain this pulse period as the center one for comparison against the next pulse period of the input. Therefore, a one pulse period shift to the right is required. In order to effect this, the signal on output line 149 from AND gate 139 (FIG. 2C) is applied through delay 160 to line 13 to cause a one pulse period shift to the right in shift register 10. This returns the contents of the shift register to the position they were in at the beginning of the operation.

To further illustrate the operation of the system, assume that the first pulse period of the stored voice signature was stored in the position adjacent to lines 56 and 82. Under these conditions, when a signal appeared on line 144, it would be accumulator 106 which had the lowest sum stored therein and logic circuit 126 would therefore be generating an output signal on T1 output line 134 from AND gate 130. The signal on line 134 is applied to fully condition AND gate 138 to generate an output signal on line 148 which is applied to condition gates 152 to pass the contents of accumulator 106 through OR gates 156 into sum accumulator 158. The signal on line 148 is also applied through delay 162 (FIG. 2A) to line 15 to cause the contents of shift register 10 to be shifted two pulse periods to the right. As indicated previously, a one pulse period shift to the right restores the contents of this register to the position they were in at the beginning of the pulse period. The shift of a second pulse period to the right brings the stored characteristics for the pulse period which was initially adjacent to lines 56 and 82 into the center position adjacent to lines 57 and 83. It is thus seen that the circuit is arranged to position the pulse period stored in shift register 10 which most nearly matches an input pulse period in the center position adjacent to lines 57 and 83 for comparison against the next pulse period of the input.

The signal on output line 144 from differentiator 146 is also applied through delay 164 (FIG. 2C), which delay is of sufficient duration to permit the above-described sequence of operations to be completed, and line 166 to reset accumulators 106–108 and to condition gates 168 to pass the contents of suc accumulator 158 to the dividend input of divider 170. The divisor input to divider 170 is outputs line 172 from P counter 28. The output from divider 170, on lines 174, which quantity is applied to average register 176, is the average deviation of the pulse periods of the voiced input, looked at so far, from the best of the three pulse periods of the voice signature which each of these pulse periods was compared against. The quantity in average register 176 is compared in compare circuit 178 against a threshold average deviation stored in register 180. Whenever the average value stored in register 176 exceeds the threshold stored in register 180, compare circuit 178 generates a signal on line 182 which is applied to indicate that a nonverify condition exists. The signal on line 182 is also applied through OR gate 183 (FIG. 2B) and line 185 to reset P counter 28.

If a signal does not appear on line 182, the system is ready to receive a new pulse period of the voiced input on lines 12. Each time the beginning of a new pulse period of the input waveform is recognized by detector 18, the count in the P counter 28 is incremented, counters 24 and 26 are reset, and flip-flop 30 is set to its one state thereby enabling gate 34. The circuit then proceeds to compare each characteristic point of the input pulse period against the corresponding characteristic point of three pulse periods stored in shift register 10 in the manner described above and to accumulate the difference between the coordinates of each of the stored pulse periods and the input pulse period in accumulators 106–108. When a predetermined number, C, of the characteristic points have been looked at, a decision is made, in compare circuits 118–120 and logic circuit 126, as to which accumulator has the lowest sum therein (and therefore which of the three pulse periods compared on in shift register 10 most nearly match the input pulse period). When this decision is made the contents of the corresponding accumulator are gated into the sum stored in sum accumulator 158, the new sum is divided by the new P count in divider 170, and a new average difference value is stored in register 176. This average difference value is then compared against a threshold difference value in register 180 and, if the new average value exceeds the threshold, a nonverify indication is generated on line 182. The signals on output lines 134–136 from logic circuit 126 also control the three pulse periods in shift register 10 which the next pulse period of the input is to be compared against. As indicated previously, these pulse periods are three adjacent pulse periods which have the pulse period most nearly matching the last pulse period looked at as their center pulse period.

For the first pulse period of the input considered above it was assumed that a signal appeared on either T1 line 134 or T2 line 135. Since, in ordinary speech, very little change is noted in the input between succeeding pulse periods, the second and several subsequent pulse periods of the input should most nearly match the pulse period stored adjacent to lines 57 and 83, resulting in signals on T2 line 135 from logic circuit 126. However, eventually a closest match will be had on the pulse period adjacent to lines 58 and 84, resulting in an output signal on T3 line 136 from logic circuit 126. The signal on T3 line 136 results in the contents of accumulator 108 being added into sum accumulator 158. When a signal is obtained on the T3 line it means that the contents of the shift register should be shifted one pulse period to the left from the condition these contents were in at the beginning of the input pulse period. It will be remembered that the shifts left which occurred as a result of the signals on output line 32 from detector 20, shifted shift register 10 left one character position less than pulse period. The signal on output line 144 from differentiator 146, which occurs at the end of each pulse period is applied through OR gate 36 and delay 112 to effect this final one character shift to the left, resulting in the shift register being shifted one pulse period to the left. Therefore, since the register is already set to the desired position, no additional shift operation is required as a result of a signal on T3 line 136.

As indicated previously, there is a mark in shift register 10 indicating the end of the voice signature. A mark detector 186 (FIG. 2A) is provided which continuously samples the coordinate position in shift register 10 which is adjacent to lines 58. When a mark is detected in this position, detector 186 generates an output signal on line 188 which is applied as one input to AND gate 190 (FIG. 2C). If there is no signal on nonverify line 182 at this time, inverter 192 is generating an output signal on line 194 which is applied to the other input of AND gate 190. When AND gate 190 is fully conditioned it generates an output signal on line 196 indicating that the identity of the individual in question has been verified. The signal on line 188 is also applied through delay 198 line 200, OR gate 183, and line 185 to reset P counter 28.

From the above it is seen that the invention provides a fully automatic system for verifying the identity of an individual by recognizing his voice. The voice may be coming in from remote locations over telephone lines or radio waves. There is therefore no requirement that the individual be at the location when verification is being made. The system has the further advantage that only the peak and valley coordinates (characteristic coordinates) for the first few characteristic points of only a selected few of the total pulse periods of an original voiced signature need be stored. This results in substantially reduced storage requirements over any comparable system. The comparison against three adjacent pulse periods of the stored voice signature permits the stored signature to be advanced in synchronism with the applied input. Also, since a verification is obtained only if the individual speaks the proper phase (i.e., his voice signature), an additional level of verification is provided by the system.

While in the description so far it has been assumed that initial identification information was supplied to the system and a proper voice signature for the alleged individual placed in shift register 10, it is apparent that the system could be modified to compare an applied input signature against a plurality of stored voice signatures and to select the voice signature which matches the applied input period. It is also apparent that, while in the embodiment of the invention shown in FIGS. 2A–2C, the characteristic coordinates of the first C characteristic points (5 for the example chosen) have been given a weight of 1, and the characteristic coordinates of all subsequent characteristic points have been given a weight of zero, some more sophisticated weighting scheme might be arrived at, either empirically or otherwise, which would give superior verification results. Also, since the inputs to the system are analog, a possible alternative to the system shown would be to store analog values of the characteristic coordinates and use analog components for performing the different operations required.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for verifying the voice of an individual comprising:

means for storing a voice signature of the individual which signature includes a plurality of characteristic coordinates;

means for determining characteristic coordinates of a voiced input from the individual;

means for selectively comparing the characteristic coordinates of said voiced input with the characteristic coordinates of said stored voice signature and generating a representation of the average difference therebetween;

and means responsive to the average difference representation between the characteristic coordinates of the voiced input and the selected characteristic coordinates of the stored voice signature exceeding a predetermined threshold for generating a non-verify indication.

2. A system of the type described in claim 1 wherein said means for storing stores a representation of the end of said voice signature;

means for detecting last said representation;

and means responsive to said detecting means and to the absence of said non-verify indication for generating a verify indication.

3. A system of the type described in claim 1 wherein said stored voice signature includes a plurality of pulse periods each having a plurality of characteristic coordinates;

means for detecting the beginning of pulse periods of said voiced input;

and means, included in said comparing means, for comparing the characteristic coordinates of each pulse period of said voiced input with the characteristic coordinates of selected ones of the pulse periods of said stored voice signature, and for determining which of the selected pulse periods has characteristic coordinates most nearly matching those of the input pulse period.

4. A system for verifying the voice of an individual comprising:

means for storing a voice signature of the individual which signature includes a plurality of pulse periods each having a plurality of characteristic coordinates, said characteristic coordinates comprising the coordinates of the peaks and valleys of a predetermined number of the first pitch periods of said plurality of pulse periods;

means for detecting the beginning of pulse periods of said voiced input;

means for determining characteristic coordinates of a voiced input from the individual;

and means for selectively comparing said characteristic coordinates of each pulse period of said voiced input with the characteristic coordinates of selected ones of the pulse periods of said stored voice signature, and for determining which of the selected pulse periods has characteristic coordinates most nearly matching those of the input pulse period and generating a representation of the average difference therebetween; and means responsive to the average difference between the characteristic coordinates of the voiced input and the selected characteristic coordinates of the stored voice signature exceeding a predetermined threshold for generating a non-verify indication.

5. A system of the type described in claim 4 wherein the pulse periods of said plurality of pulse periods are ones whose characteristic coordinates differ significantly from each adjacent pulse period of the voice signature.

6. A system of the type described in claim 5 including means for controlling the rate at which succeeding pulse periods of said stored voice signature are selected as said selected ones of the pulse periods in a manner such that each pulse period of a matching voiced input is always compared against the most-nearly-matching pulse period in said stored voice signature.

7. A system for verifying the voice of an individual comprising:

means for storing a voice signature of the individual which signature includes a plurality of pulse periods each having a plurality of characteristic coordinates;

means for detecting the beginning of pulse periods of said voiced input from an individual;

means for determining characteristic coordinates of said voiced input;

means for selectively comparing said characteristic coordinates of each pulse period of said voiced input with the characteristic coordinates of selected ones of the pulse periods of said stored voice signature, wherein said selected ones of the pulse periods of the voice signature are three adjacent pulse periods, including means for determining which of said three adjacent pulse periods of said voice signature has characteristic coordinates most nearly matching those of a pulse period of said voiced input;

control means for causing said most-nearly-matching pulse period of said voice signature to be the center pulse period of the three adjacent pulse periods which the next pulse period of said voiced input are compared against;

means for generating a representation of the average difference between said selected charactristic coordinates of the voiced input and said selected characteristic coordinates of said stored voice signature; and means responsive to said average difference exceeding a predetermined threshold for generating a non-verify indication.

8. A system of the type described in claim 7 wherein said stored voice signature is stored in a shift register;

and wherein said control means includes means responsive to the right-hand one of said three adjacent pulse periods being the most-nearly-matching one for causing an effective one pulse period shift to the left in said shift register;

means responsive to the center one of said three adjacent pulse periods being the most-nearly-matching one for causing the contents of said shift register to be restored to their initial condition;

and means responsive to the left-hand one of said three adjacent pulse periods being the most-nearly-matching one for causing an effective one pulse period shift to the right in said shift register.

9. A method of verifying the identity of an individual comprising the steps of:

storing a voice signature of the individual which signature includes a plurality of characteristic coordinates;

determining the characteristic coordinates of a voiced input from an individual;

selectively comparing the characteristic coordinates of said voiced input with the characteristic coordinates of said stored-voice signature and generating a representation of the average difference therebetween; and generating a non-verify indication when the average difference between the characteristic coordinates of the voiced input and the selected characteristic coordinates of the stored voice signature exceed a predetermined threshold.

10. A method of the type described in claim 9 including the steps of:

storing a representation of the end of said voice signature;

detecting last said representation; and generating a verify indication if last said representation is detected before a non-verify indication is generated.

11. A method of verifying the identifying of an individual comprising the steps of:

storing a voice signature of the individual which signature includes a plurality of pulse periods, each having a plurality of characteristic coordinates, said pulse periods being those of an original voiced input which differ significantly from adjacent stored pulse periods;

determining the characteristic coordinates of a voiced input from an individual;

selectively comparing the characteristic coordinates of a given pulse period of said voiced input with the characteristic coordinates of selected ones of pulse periods of said stored-voice signature;

determining which of said selected pulse periods has coordinates most nearly matching those of said given input pulse period;

utilizing said above determination to control the rate at which succeeding pulse periods of said stored voiced signature are selected as said selected ones of the pulse periods in a manner such that each pulse period of a matching voiced input is always compared against the most-nearly-matching pulse period of said stored voiced signature; and generating a non-verify indication when the average difference between the characteristic coordinates of the voiced input and the selected characteristic coordinates of the stored voiced signature exceed a predetermined threshold.

12. A method of the type described in claim 11 wherein only the coordinates of a predetermined number of the first peaks and valleys of said plurality of pulse periods are stored as said stored voice signature.

13. A method of the type described in claim 11 wherein the selected ones of said plurality of pulse periods are three adjacent pulse periods and said manner of selecting said three adjacent pulse periods of the stored voice signature is such that the center one of the three adjacent pulse periods which are compared against a given input pulse period is the pulse period of the stored voice signature which most nearly matched the previous input pulse period.

14. A system for verifying the voice of an individual comprising:

means for storing a voice signature of the individual which signature includes a plurality of characteristic coordinates and wherein said voice signature comprises data representative of less than a full word and includes a representation of the end of said voice signature;

means for determining characteristic coordinates of a voiced input from the individual;

means for selectively comparing the characteristic coordinates of said voiced input with the characteristic coordinates of said stored voice signature and generating a representation of the average difference therebetween;

means responsive to the average difference representation between the characteristic coordinates of the voiced input and the selected characteristic coordinates of the stored voice signature exceeding a predetermined threshold for generating a non-verify indication;

means for detecting said representation of the end said voice signature;

and means responsive to said detecting means and to the absence of said non-verify indication for generating a verify indication.

References Cited

UNITED STATES PATENTS

| | | |
|---|---|---|
| 3,202,761 | 8/1965 | Bibbero. |
| 3,129,287 | 4/1964 | Bakis. |
| 3,036,268 | 5/1962 | Smith. |
| 2,866,899 | 12/1958 | Busignies et al. |
| 2,685,615 | 8/1954 | Biddulph et al. |
| 2,403,986 | 7/1946 | Lacy. |

KATHLEEN H. CLAFFY, Primary Examiner

ARTHUR A. McGILL, Assistant Examiner

U.S. Cl. X.R.

324—77